United States Patent [19]

Matsuda et al.

[11] Patent Number: 5,496,608
[45] Date of Patent: Mar. 5, 1996

[54] OPTICAL RECORDING MEDIUM

[75] Inventors: Riki Matsuda; Kazunari Taki, both of Nagoya, Japan

[73] Assignee: Brother Kogyo Kabushiki Kaisha, Aichi, Japan

[21] Appl. No.: 307,456

[22] Filed: Sep. 19, 1994

[30] Foreign Application Priority Data

Sep. 22, 1993 [JP] Japan .................. 5-236625
Sep. 22, 1993 [JP] Japan .................. 5-236627
Sep. 22, 1993 [JP] Japan .................. 5-236628

[51] Int. Cl.⁶ ............................................. B32B 3/00
[52] U.S. Cl. ............... 428/64.1; 428/64.2; 428/64.4; 428/457; 428/913; 430/270.12; 430/945; 369/283; 369/288
[58] Field of Search ..................... 428/64, 65, 913, 428/64.1, 64.2, 64.4, 457; 430/220, 495, 945; 369/283, 288

[56] References Cited

U.S. PATENT DOCUMENTS

| | | | |
|---|---|---|---|
| 5,147,701 | 9/1992 | Furukawa | 428/64 |
| 5,171,618 | 12/1992 | Suzuki | 428/64 |
| 5,298,305 | 3/1994 | Shinozuka | 428/64 |
| 5,346,740 | 9/1994 | Ohno | 428/64 |
| 5,362,537 | 11/1994 | Itoh | 428/64 |

*Primary Examiner*—Patrick J. Ryan
*Assistant Examiner*—Elizabeth Evans
*Attorney, Agent, or Firm*—Oliff & Berridge

[57] ABSTRACT

An optical recording medium formed from a transparent substrate, an enhancement layer formed on the substrate, a guide layer, an interference layer, a recording layer, a protective layer, and a reflective layer. A recording region is formed on the guide layer by etching to a predetermined spiral or a coaxial circular pattern. Because the enhancement layer is formed from a compound of aluminum such as $Al_2O_3$, it is not etched during plasma etching using a gas mixture of carbon tetrachloride and oxygen. Therefore, the recording region remains smooth and noise generated by roughness between layers can be prevented. By making the thickness of the guide layer 20 nm or more, light which passes through the guide layer and which generates multi-layer interference between the recording layer and the reflective layer is reduced and the amount of reflective light is increased, Therefore, fluctuations in the pushpull signal by the fluctuations in the thickness of the guide layer is reduced. By making the guide layer 40 nm or less thick, noise from the guide layer can be reduced.

17 Claims, 8 Drawing Sheets

OPTICAL RECORDING MEDIUM

BACKGROUND OF THE INVENTION

1. Field of the Invention

The present invention relates to an optical recording medium on which information is recorded, reproduced, and erased using light.

2. Description of the Related Art

Increases in amounts of information, such as image data for multimedia systems, to be processed have brought about a need to increase the density of memories for storing the information. Once stored, this information must also be easily accessible. Optical disks are an example of a high density, easily accessible memory. However, there has been a need to further increase the transmission rate (amount of information transmitted per unitary time) to and from optical disks. Some methods of increasing the transmission rate include increasing the rotational speed of the disk, increasing the modulation frequency, and reducing the access time of an optical head to the optical disk.

Figures 1A, 1B:
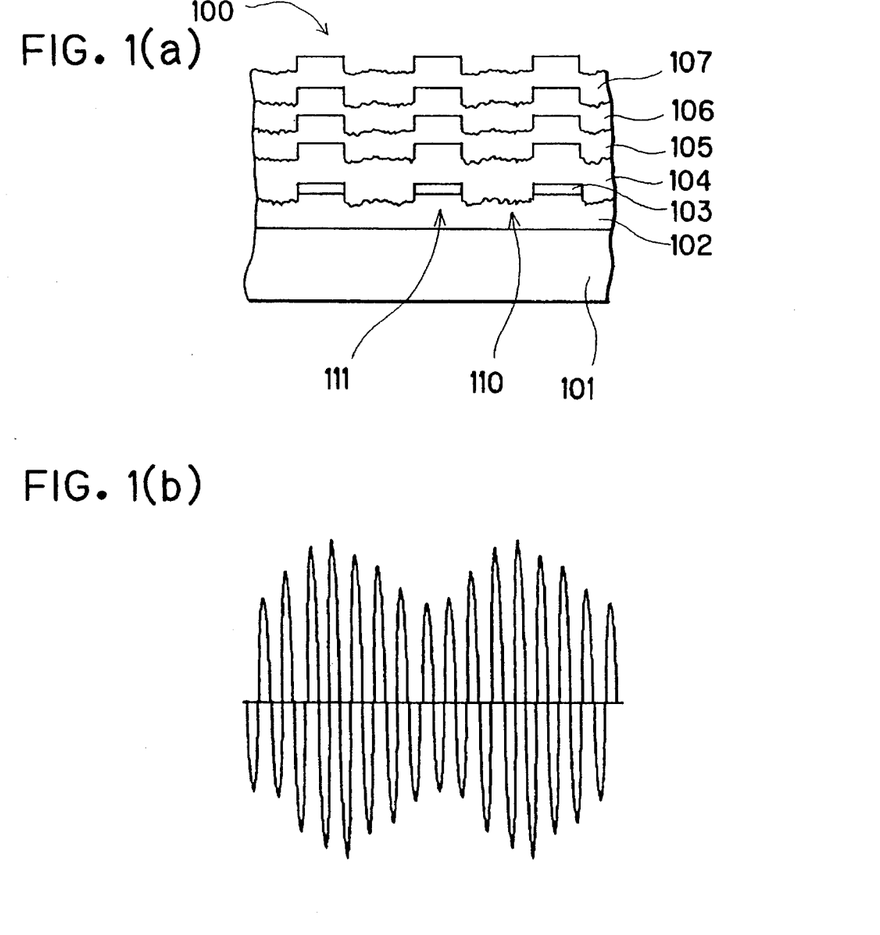
FIG. 1(a) is a cross-sectional view showing a conventional optical recording medium.
FIG. 1(b) is a view showing fluctuations in the waveform of a signal from the conventional optical recording medium shown in FIG. 1(a)

Optical recording medium with metal guide layer allows forming tracks on the optical recording medium at a narrower pitch than can be formed in optical recording medium with guide grooves. As shown in FIG. 1(a), the optical recording medium 100 includes a transparent substrate 101; an enhancement layer 102 which is formed on the substrate 101; a guide layer 103; an interference layer 104; a recording layer 105; a protective layer 106; and a reflective layer 107. Recording regions 110 having predetermined width are formed either a coaxial or spiral pattern. Guide regions 111 are provided along the recording regions 110 and are also coaxial or spiral pattern. Guide layers 103 are provided on the enhancement layer 102 at the guide region 111.

The substrate 101 is formed from glass and the guide layer 103 is formed from a metal such as tantalum (Ta). The 10 material of the recording layer 105 is selected in conformity with the type of recording method used for the optical recording medium 100. For example, tellurium (Te) is suitable in the case of forming pits on the recording layer 105; germanium-tellurium-antimony (GeTeSb) is suitable for phase change recording; and terbium iron cobalt (TbFeCo) is suitable for magneto-optical recording. The reflective layer 107 is made from aluminum (Al) or an alloy thereof. The enhancement layer 102, the interference layer 104, and the protective layer 106 are made from a silicon nitride (SiN). Silicon nitrides contain no oxygen and are fairly impermeable to water vapor. Therefore, silicon nitrides are very useful for preventing oxidation of the recording layer 105.

Generally, the thickness $T_e$ of the enhancement layer 102 is determined by the following formula:

$$T_e = \lambda/(8n_1)$$

wherein $\lambda$ is the laser wavelength; and $n_1$ is refraction rate of the enhancement layer 102. The thickness $T_i$ of the interference layer 104 is determined by the following equation:

$$T_i = \lambda/(8n_2)$$

wherein $n_2$ is the refraction rate of the interference layer 104. The protective layer is usually formed to 30 nm, the recording layer 105 to 25 nm, and the guide layer 103 preferably to 20 nm.

The optical recording medium 100 is produced using the following method. First, the enhancement layer 102 is formed from a layer of silicon nitride sputtered on the substrate 101. Next, a layer of tantalum is formed, also using sputtering techniques, on the enhancement layer 102. A predetermined spiral track pattern is etched in the layer of tantalum using well-known lithography techniques to produce the guide layer 103. In this example, the layer of tantalum is etched using plasma etching, which uses a mixture of flon 14 ($CF_4$) and oxygen ($O_2$). In standard etching, changes in etching conditions can cause changes in etching speed. Therefore to insure that the tantalum guide layers are completely formed, the tantalum layer is overetched, that is, etched for a duration of time several tens of percent longer than the etching time calculated as required to produce guide layers from a standard tantalum film at a standard etching speed. Recording region 110 is formed during removal of the guide layer 103. Finally, the SiN interference layer 104, the recording layer 105, the SiN protective layer 106, and the Al reflective layer 107 are formed by sputtering techniques.

Recording is performed in the optical recording medium 100 by passing laser light, collected by, for example, an objective lens (not shown), through recording region 110 and irradiating the recording layer 105 therewith. The irradiated portion of the recording layer 105 is deformed, phase changed, or inversely magnetized, depending on the recording method used, so as to form recording marks. The recording marks have a Kerr rotation angle or a reflectivity that is different from those of non-irradiated portions. The thus-recorded information is reproduced by detecting the changes in Kerr rotation angle or reflectivity at the recording marks.

Tracking is performed using well-known pushpull methods based on light reflected from the guide region 111 and diffracted at the interface between guide region 111 and the recording region 110. Interference light, resulting from interference between the reflected light and the deflected light, is detected at two light receiving portions. Tracking error is determined by detecting difference between intensity of light detected at the two light receiving portions.

Silicon nitride is also etchable using plasma etching, which uses a mixture of $CF_4$ and $O_2$. Silicon nitride is etched at a rate of 60 nm every minute compared to a rate of about 120 nm every minute for tantalum. Therefore, after the tantalum layer is completely etched away when forming the guide layers 103, the silicon nitride layer of the enhancement layer 102 is also etched at recording regions 110 as shown in FIG. 1(a). Sputter accumulates at exposed surfaces, that is, at recording regions 110, of the enhancement layer 102 to form rough surfaces in recording regions 110 of the enhancement layer 102. The rough areas in the surface of the enhancement layer 102 translate into rough areas at the recording regions 110 of the interference layer 104, the recording layer 105, the protective layer 106, and the reflective layer 107. The rough areas at each interface become a source of noise when information is recorded and reproduced at the recording region 110 of the recording layer 105. When noise increases, the signal to noise ratio drops, the error rate increases, and reliability also decreases.

Further, when the track pitch is narrowed as a result of providing tantalum guide layers 103, tracking characteristics such as divided pushpull signal and the strength of the pushpull signal drop so that tracking drive can not be stably operated.

When formed to a thickness of 20 nm, a tantalum guide layer 103 greatly effects reflectivity from multiple interference between the reflective layer 107, the guide layer 103, and the recording layer 105. Therefore, as shown in FIG. 1(b) the pushpull signal greatly fluctuates with variation in the thickness of the guide layer 103. When the pushpull signal is at a low point in fluctuations, tracking gain is insufficient for stable tracking. On the other hand, when, also as a result of fluctuations, the pushpull signal is too strong, gain can become excessive so that the servo circuit oscillates, thereby causing tracking error.

SUMMARY OF THE INVENTION

In view of the foregoing, it is an object of the present invention to overcome the above-described problems by providing a highly reliable optical recording medium, the drive of which can be stably performed and with which stable tracking can be performed.

To achieve the above and other objects, there is provided, according to one aspect of the present invention, an optical recording medium comprising a substrate; a recording layer; an enhancement layer formed between the substrate and the recording layer from an aluminum compound layer made from a compound that contains aluminum; a guide layer formed between the substrate and the recording layer into a predetermined pattern; and an interference layer formed between the substrate and the recording layer.

In the optical recording medium, the enhancement layer is made from an unetchable aluminum compound. The unetchable aluminum compound of the enhancement layer is a material selected from the group consisting of AlN, $Al_2O_3$, and SiAlON.

The enhancement layer may further include a non-aluminum layer formed from a material other than an aluminum compound. the non-aluminum layer is closer to the substrate than is the aluminum compound layer. Further, the aluminum compound layer is closer to the substrate than is the non-aluminum layer. The non-aluminum layer is formed from a material which accumulates faster during sputtering than does the compound of the aluminum compound layer.

A protective layer formed from a silicon nitride may further be provided.

According to another aspect of the present invention, there is provided an optical recording medium comprising: a substrate; a recording layer; an enhancement layer formed between the substrate and the recording layer; a guide layer formed between the substrate and the recording layer into a predetermined pattern from a material with a high reflectivity to a thickness of 50 nm or less; and an interference layer formed between the substrate and the recording layer.

Preferably, the guide layer is formed to a thickness of 20 nm or greater and 40 nm or less, and the guide layer is formed to a thickness of 23 nm or greater and 40 nm or less. The material of the guide layer is selected from a group consisting of tantalum, chrome, and aluminum.

According to still another aspect of the present invention, there is provided an optical recording medium comprising: a substrate; a recording layer; an enhancement layer formed between the substrate and the recording layer; a guide layer formed between the substrate and the recording layer into a predetermined pattern from chrome; and an interference layer formed between the substrate and the recording layer.

Preferably, the guide layer is formed to a thickness of 5 nm or greater and 50 nm and less, and the guide layer is formed to a thickness of 20 nm or greater and 50 nm and less. The guide layer is formed using plasma etching techniques. The plasma etching techniques involve application of a fluorine compound. The fluorine compound is selected from a group consisting of $CHF_3$ and $CF_4$.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

An optical recording medium according to preferred embodiments of the present invention will be described while referring to the accompanying drawings wherein like parts and components are designated by the same reference numerals to avoid duplicating description.

Figure 2:
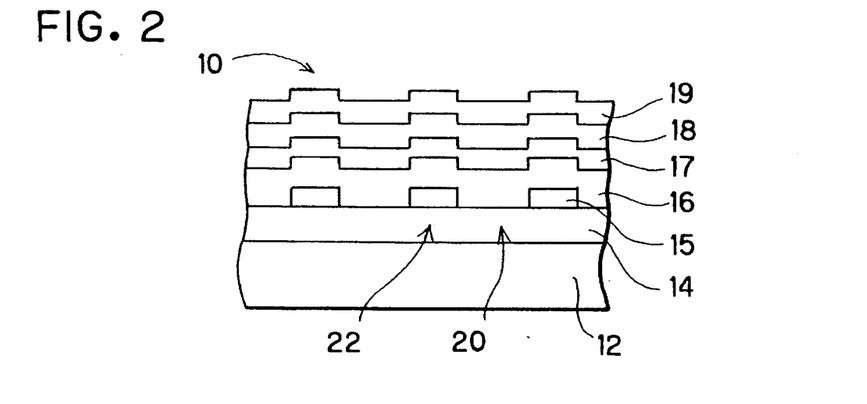
FIG. 2 is a cross-sectional view showing an optical recording medium according to a first preferred embodiment of the present invention.

An optical recording medium 10 according to a first preferred embodiment of the present invention will be described while referring to FIG. 2. The optical recording medium 10 is made from an enhancement layer 14, guide layers 15, an interference layer 16, a recording layer 17, a protective layer 18, and a reflective layer 19, provided in this 10 order to a transparent substrate 12. Guide layers 15 are provided to a predetermined width in a coaxial or a spiral pattern. Guide regions 22 are defined by the predetermined width of the guide layers 15. Recording regions 20 are defined by regions between adjacent bands.

The transparent substrate 12 is formed from glass or a resin such as amorphous polyolefine. When the recording medium 10 is to be used with magneto-optical recording and reproduction techniques, the recording layer 17 is formed either from amorphous alloys of rare-earth and/or transitional elements such as TbFeCo, TbFe, GdTbFe, or from super thin films of platinum (Pt) and cobalt (Co) that are multi-layered and laminated so as to form a superlattice thin film. The interference layer 16 and the protective layer 18 are formed from a transparent conductor such as silicon nitride. The enhancement layer 14 is formed from an aluminum compound such as AlN, $Al_2O_3$, or SiAlON.

Figure 3A:
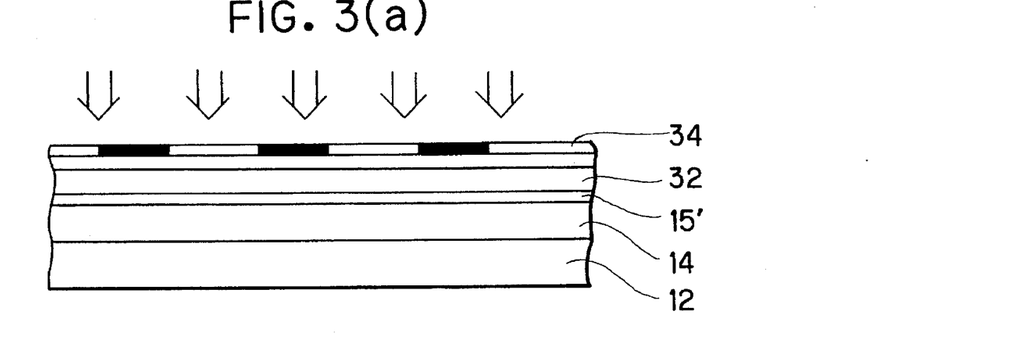
FIG. 3(a) through FIG. 3(d) are cross-sectional views showing steps of a process for producing the optical recording medium shown in FIG. 2.
Figure 3B:
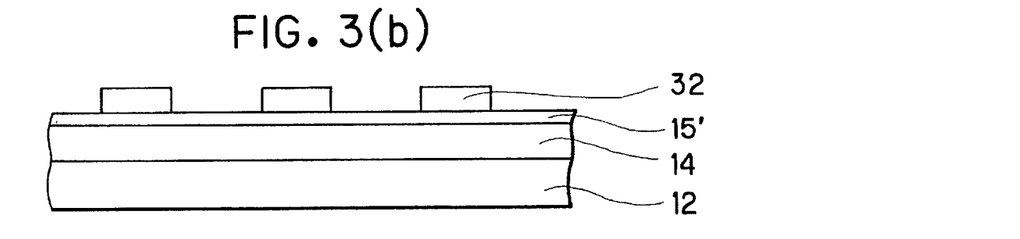

A method for producing the optical recording medium of the present embodiment will be provided while referring to FIGS. 3(a) through 3(d). As shown in FIG. 3(a), a layer of $Al_2O_3$ is formed on the substrate 12 by well-known thin film forming techniques, such as sputtering or vacuum evaporation, to form the enhancement layer 14. A layer of tantalum 15', from which the guide layers 15 will be formed, is formed on the enhancement layer 14 also by well-known thin film forming techniques such as sputtering or vacuum evaporation. A photoresist 32 is coated onto the layer of tantalum 15' by spin coating. A photomask 34, which is formed in a predetermined coaxial (concentric) or spiral pattern, is brought into intimate contact with the photoresist 32. Exposure is performed by irradiating the photoresist with ultraviolet light through the photomask 34. Next, development processes are performed to dissolve irradiated portions of the photoresist 32 so that the pattern of the photomask 34 is transcribed to the photoresist as shown in FIG. 3(b).

Figure 3C:
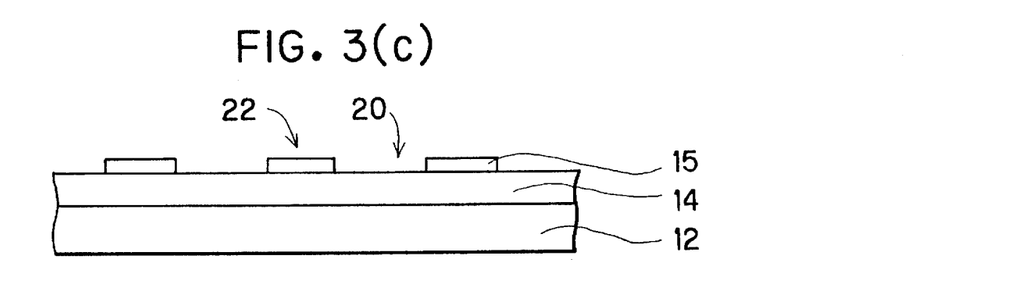
Figure 3D:
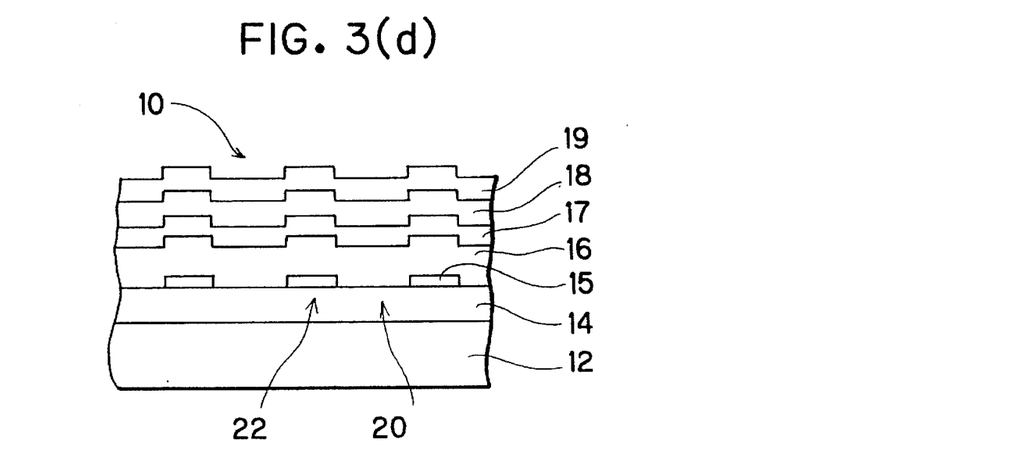

Portions of the tantalum layer 15' that are not covered with photoresist 32 are then etched away by plasma etching techniques using a gas mixture of $CF_4$ and $O_2$. The photoresist 32 is then removed to form the guide layers 15 as shown in FIG. 3(c), thereby defining the pattern of the guide regions 22 and the recording regions 20. Finally, the interference layer 16, the recording layer 17, the protective layer 18, and the reflective layer 19 are formed in order as shown in FIG. 3(d) using well-known thin film forming techniques such as sputtering to produce the optical recording medium 10 of the present embodiment.

The tantalum layer 15' of the guide layer 15 is easily etched using plasma etching with a gas mixture of $CF_4$ and $O_2$. No residue from etching remains on the surface after etching. However, the $Al_2O_3$ of the enhancement layer 14 is not etchable using such plasma etching. Therefore, the surface at the recording region 20 of the enhancement layer 14 remains smooth as shown in FIG. 3(c). Accordingly, the transitions between layers formed on the enhancement layer 14, that is, between the interference layer 16, the recording layer 17, the protective layer 18, and the reflective layer 19, are also smooth at the recording regions 20. Noise generated during recording and reproduction at the rough transitions between layers can be prevented. Further, because the recording layer 17 is protected by silicon nitride, which is extremely good at preventing oxidation, the error rate caused by oxidation of the recording layer 17 increases only slightly over time.

The guide layers can be made using any material, such as molybdenum, tungsten, titanium, or platinum, that is etchable by plasma etching with a gas including $CF_4$ or $CF_4$. Plasma etching can be performed using gas mixtures other than a mixture of $CF_4$ and $O_2$. For example, other gases can be used instead of $O_2$. Gases made from other fluorine compounds, such as $CHF_3$, can be used instead of $CF_4$.

The enhancement layer 14 can be made from any aluminum compound, such as AlN or SiAlON, that is not etchable by plasma etching using $CF_4$ gas.

The recording layer 17 can be formed from materials other than those applicable with magneto-optical recording techniques. For example, the recording layer 17 can be formed from organic pigments; from tellurium (Te) or other materials applicable with pit-forming recording; or from germanium-tellurium-antimony (GeTeSb) or other materials applicable with phase change recording. There are no particular limitations to the material of the substrate 12, the interference layer 16, or the protective layer 18. The reflective layer 19 need not be provided.

Figure 4:
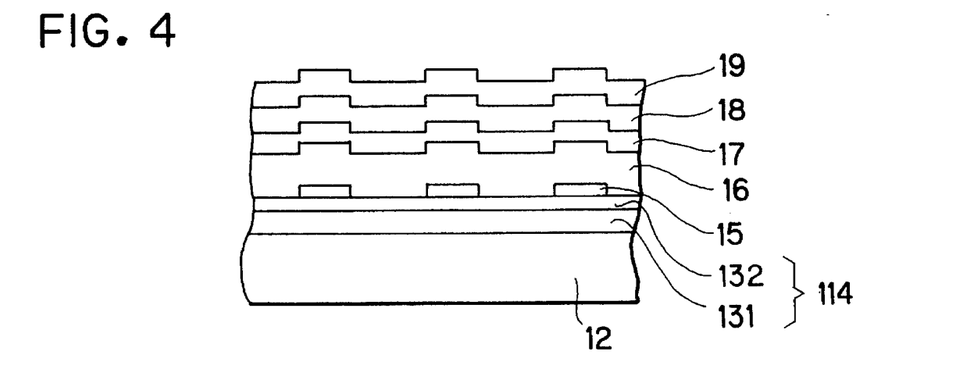
FIG. 4 is a cross-sectional view showing a possible modification of the optical recording medium according to the first preferred embodiment.

An enhancement layer 114 of double-layer structure can be provided, which includes a substrate-side enhancement layer 131 and a guide-layer-side enhancement layer 132 as shown in FIG. 4. For example, the substrate-side enhancement layer 131 can be formed from SiN on the substrate 12 and the guide-layer-side enhancement layer 132 can be formed from an aluminum compound such as $Al_2O_3$ on the layer 131. Because the guide-layer-side enhancement layer 132 is formed from an aluminum compound, it will not be etched during plasma etching with a gas mixture of $CF_4$ and $O_2$. Increase in noise can therefore be prevented. Because silicon nitride accumulates faster than $Al_2O_3$ during sputtering, producing the two layer enhancement layer 114 requires less sputtering time than producing the single layer enhancement layer 14. Thus providing the substrate-side enhancement layer 131 increases productivity.

Figure 5:
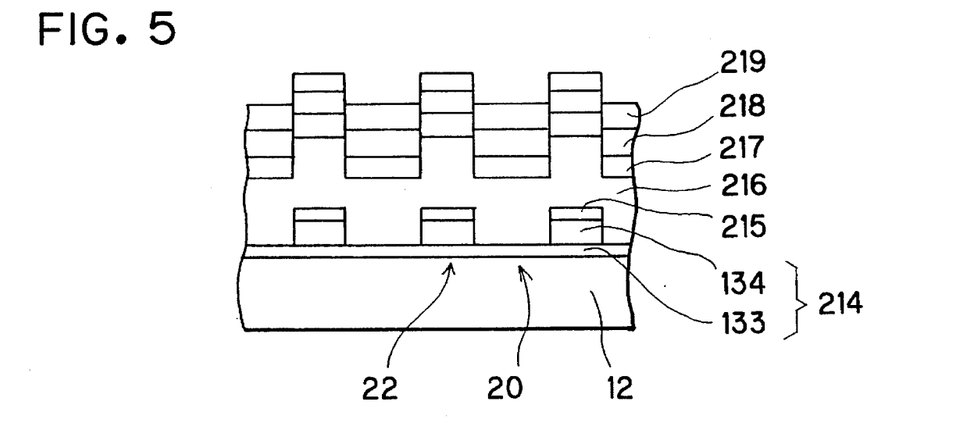
FIG. 5 is a cross-sectional view showing another possible modification of the optical recording medium according to the first preferred embodiment.

An enhancement layer 214 can be formed as shown in FIG. 5 from a substrate-side layer 133 and a guide-layer-side enhancement layers 134. The guide-layer-side enhancement layers 134 are etched out of a layer of etchable material, such as SiN, that is formed on the substrate-side enhancement layer 133, which is made from a material, such as $Al_2O_3$, that can not be etched using plasma etching. Therefore, the transitional surface of the recording region 20 remains smooth and increase in noise can be prevented. Further, the guide-layer-side enhancement layers 134 raise portions of the recording layer 217 at the recording regions 20. The difference in level between portions of the recording layer 217 at the recording regions and at the guide regions 22 prevents conduction of heat between adjacent recording regions. Recording marks are prevented from spreading. Thus an optical recording medium with little crosstalk can be provided.

Figure 6:
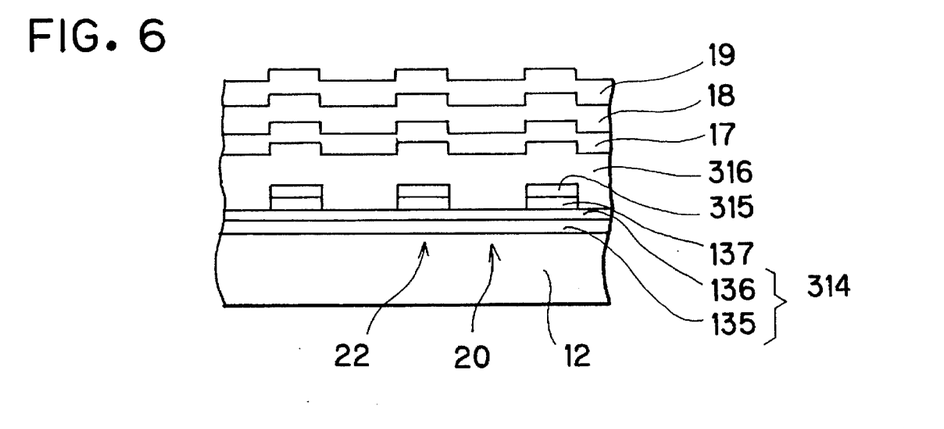
FIG. 6 is a cross-sectional view showing still another possible modification of the optical recording medium according to the first preferred embodiment.

The enhancement layer can be made from a plurality of layers, as long as one of the layers is formed from $Al_2O_3$ or other aluminum compound. For example, as shown in FIG. 6, an enhancement layer 314 can be made from a first enhancement layer 135, a second enhancement layer 136 formed from $Al_2O_3$, and a third enhancement layers 137. To produce this structure, a layer of etchable material is formed on the second enhancement layer 136. When etching is performed to form the guide layers 315, the enhancement layers 137 are also etched out of the layer of etchable material on the second enhancement layer 136. The second enhancement layer 136, however, is not affected by etching. Therefore, the interface with the recording region 20 will be smooth and noise can be prevented.

Figure 7:
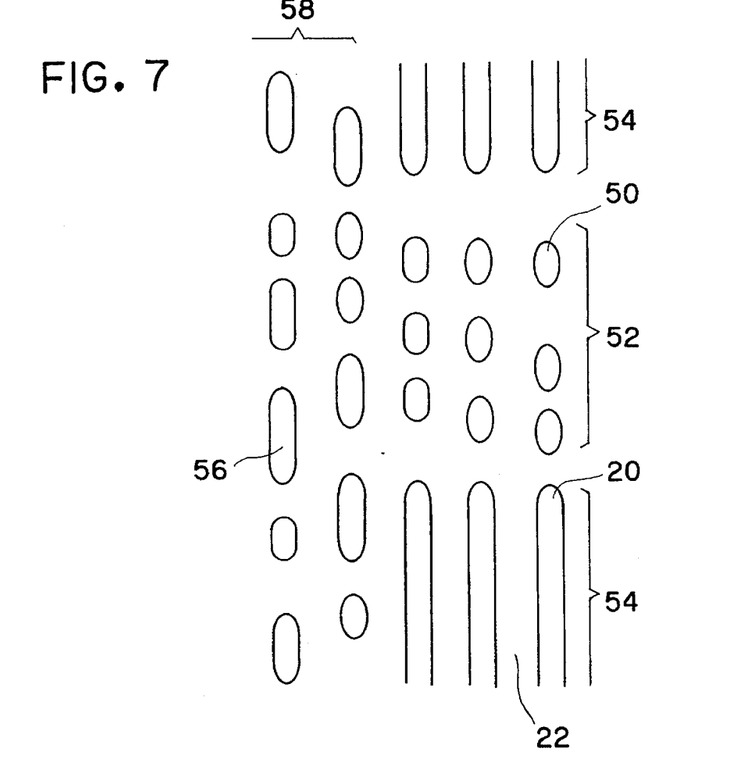
FIG. 7 is a top view showing an example for a pattern in guide layers formed in an optical recording medium according to the present invention.

The guide layers 315 can be formed in other patterns other than spiral or coaxial circular patterns. For example, a preformat can be provided as shown in FIG. 7. The preformat can be made up of index portions 52 and data portions 54. The index portions 52 can be formed in patterns of bits 50 which indicate addresses and other information. The data portion 54 can include recording region 20 on which data is recorded. A ROM region 58, made only from bits 56, can also be formed to one portion of the optical recording medium.

The optical recording medium need not be produced by using exposure through a mask. After coating with the resist, exposure can be performed by rotating the substrate 12 and selectively irradiating the resist with an argon laser.

Next, an optical recording medium according to a second preferred embodiment of the present invention will be described. The optical recording medium according to the second preferred embodiment is constructed substantially the same as the optical recording medium described in the first preferred embodiment, except that the guide layers 15 are made from chrome at a thickness less than 50 nm thick, and preferably between 5 and 25 nm thick.

Next, a method of producing the optical recording medium according to the second preferred embodiment will be described. As when manufacturing the optical recording medium according to the second preferred embodiment, an enhancement layer 14 is accumulated on a glass substrate 12 by accumulating silicon nitride using sputtering, vacuum evaporation, or chemical vapor phase epitaxy. The following example will be provided assuming sputtering techniques are employed.

The glass substrate 12 is set in a sputtering device. Silicon with a purity of 99.9% or more is used as the target. Argon, as the sputtering gas, and nitrogen, as the reaction gas, are introduced at a ratio of 50:6, at a total flow rate of 60 cc/min, and under a pressure of 0.3 Pa until the enhancement layer 14 is accumulated to 46+/-5 nm thick. Next, a chrome layer is formed on the enhancement layer 14 by using a chrome target of 99.9% purity and by introducing argon as the sputtering gas at a flow rate of 30 cc/min and at a pressure of 0.15 Ps until a chrome layer of 50 nm or less, and preferably between 5 and 25 nm, thick is accumulated on the enhancement layer 14.

Next, using a positive resist, the resultant substrate 12 is rotated at several hundred RPM and coated with the resist. Afterward, the rotation is increased to several thousand RPM. Rotation at several thousand RPM is continued for about 30 seconds until the thickness of the resist film is a uniform 500 nm or less. Afterward, the resist film is heated and dried at a temperature of about 90° C.

Next, the resultant substrate 12 is exposed, either by direct exposure with a laser beam or exposure through a mask, in a spiral or coaxial circular pattern. Development, drying, and etching are performed after exposure is completed.

Etching is performed using dry etching with chlorine gas. An example of a dry etching method using a mixture of carbon tetrachloride ($CCl_4$) and oxygen gases will be described below. The chamber is exhausted to $10^{-2}$ Pa or less. Carbon tetrachloride and oxygen are introduced into the chamber at a ratio of 2:3 until pressure reaches 30 Pa. While maintaining this pressure, a frequency of 13.56 MHz is applied to one side of a vertically opposing electrode to generate a plasma of the carbon tetrachloride and oxygen mixture. The chrome on the substrate 12 is etched while maintained in the plasma. It should be noted that the etching rate of chrome is 100 times faster than that of silicon nitride.

Afterward, oxygen only is introduced to etch the resist. Alternatively, the resist can be removed using an organic solvent. An interference layer 16, formed from a silicon nitride thin film, is formed on this using the same method as for forming the enhancement layer 14.

The thin films of the enhancement layer 14 and the interference layer 16 are formed so that their total thickness T is represented by the following equation:

$$T=\lambda/4$$

wherein $\lambda$ is the wavelength of the laser of the magneto-optical disk drive; and n is the refraction rate of the enhancement layer 14 and the interference layer 16.

On the resultant substrate 12, a magnetic medium of TbFeCo is formed to a thickness of 25 nm, a protective layer 18 of silicon nitride is formed to a thickness of 30 nm, and a reflective film of aluminum is formed to a thickness of 30 nm in order using sputtering techniques.

Figure 8:
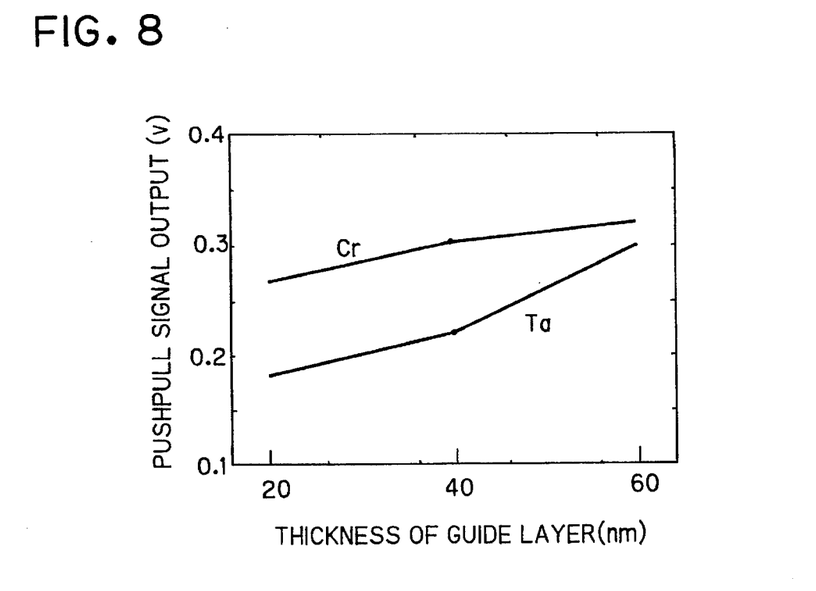
FIG. 8 is a graphical representation showing voltage of pushpull signals from different guide layers formed from two different materials versus thickness of the guide layers.

Two sets of trials were performed to determine effect of guide layer thickness on output from an optical recording medium with chrome guide layers 15 according to the second preferred embodiment and on output from an optical recording medium with tantalum guide layers. The results of the trials can be compared in the graph of FIG. 8. As can be seen chrome guide layers 15 outputted greater signals than did tantalum guide layers of any comparable thickness. This difference was particularly striking at 20 nm thickness, where the chrome bands outputted a signal twice as great as did the tantalum guide layers.

Figure 9:
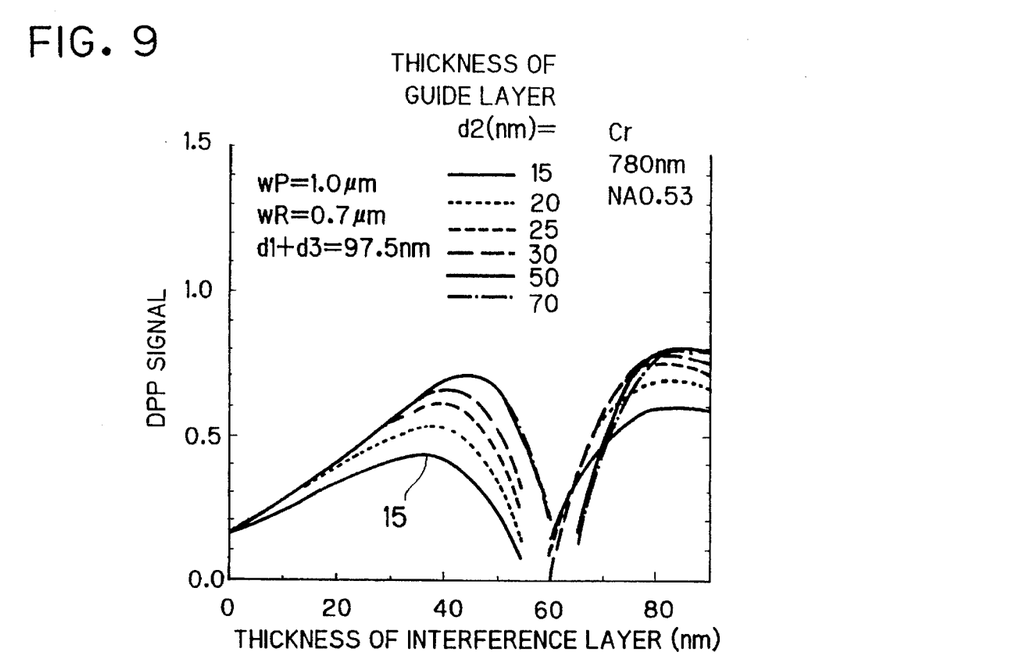
FIG. 9 is a graphical representation showing voltages of divided pushpull signals from chrome guide layers of various thicknesses versus thickness of an interference layer.

Trials were performed to determine effects of the thickness of the interference layer 16 on the strength of the divided pushpull signal (i.e., the value of the pushpull signal divided by the total reflected amount) outputted by chrome guide layers 15 of various thicknesses. As can be seen in FIG. 9, level of divided pushpull signal (DPP signal) outputted from 70 nm thick chrome guide layers were the same as those from 50 nm thick chrome guide layers 15. The results therefore show that the strength of the DPP signal saturates when the film thickness of the guide layer 15 is 50 nm. Only noise increases when the film thickness of guide layers is increased over 50 nm. Therefore it is preferable for the film thickness of guide layers 15 to be 50 nm or less.

Figure 10:
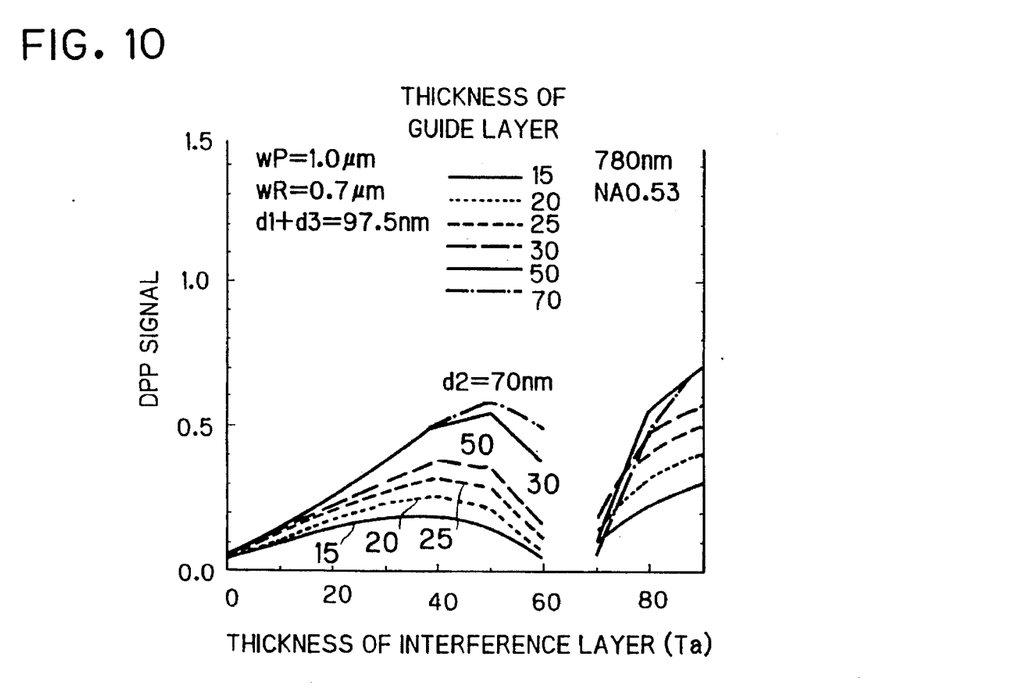
FIG. 10 is a graphical representation showing voltages of divided pushpull signals from tantalum guide layers of various thicknesses versus thickness of an interference layer.

The thinnest chrome guide layer 15 tested in these trials was 15 nm thick. It can be speculated by comparing FIGS. 9 and 10 that a tantalum guide layer of about 35 nm thick would probably output a DPP signal with about the same strength as outputted by the 15 nm thick chrome guide layer 15. It can be speculated that chrome guide layers 15 as thin as 5 nm will output a sufficiently strong DDP signal.

The present invention can be applied to an optical disk for reproduction only wherein the total surface is covered with bits 56.

Next, a description of an optical recording medium according to a third preferred embodiment of the present invention will be provided. The optical recording medium according to the third preferred embodiment is constructed substantially the same as the optical recording medium described in the second preferred embodiment, except that the enhancement layer 14, the protective layer 18, and the reflective layer 19 need not be provided. In this case, the optical recording medium 10 includes an interference layer

16 formed from a 48.5 nm thick film of silicon nitride; a recording layer 17 formed from an 80 nm thick film of TbFeCo; and guide layers 15 formed from a tantalum spatter film with refractive index of 3.8-j2.0.

Figure 11:
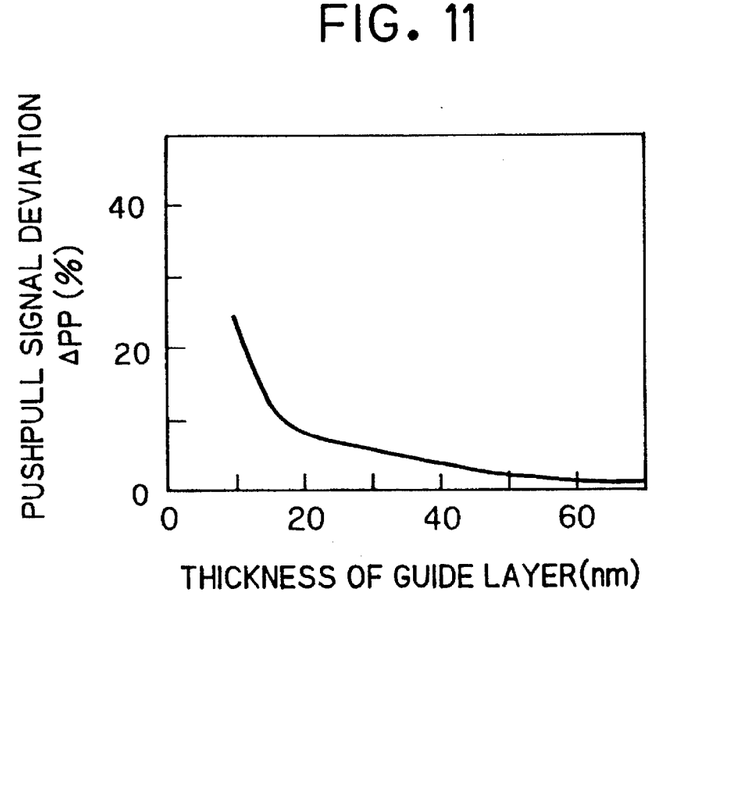
FIG. 11 is a graphical representation showing percentage change of pushpull signals versus thickness of the guide layers.
Figure 12:
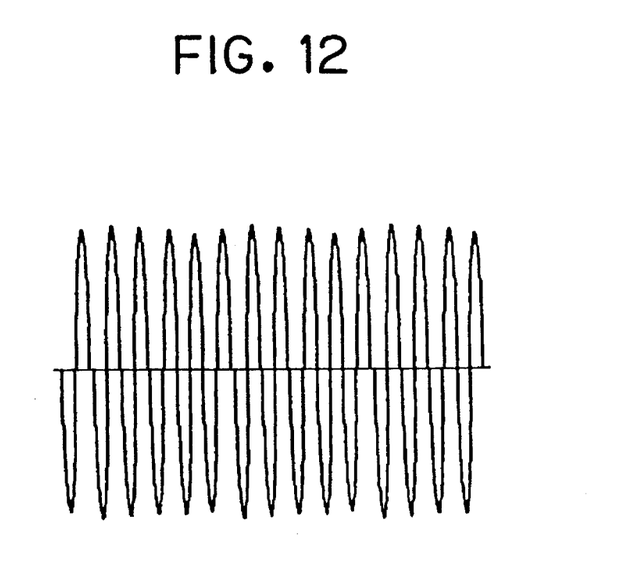
FIG. 12 is a waveform showing fluctuations in a pushpull signal from a guide layer according to the present invention.

FIG. 11 shows fluctuation in pushpull signal ΔPP produced by +/−3% unevenness in guide layers of various thicknesses. When the thickness of guide layers is 20 nm or less, the fluctuation in the resultant pushpull signal ΔPP is a large 10% or more. However, when the thickness of the guide layers 15 is 25 nm, fluctuations in the resultant pushpull signal ΔPP drop to only about 6%. For this reason, the pushpull signal shows only a slight fluctuation as shown in FIG. 12. In this case, tracking can be stably performed by appropriately setting the tracking gain. Therefore, by making the guide layer 15 to 20 nm thick or thicker, light which penetrates the guide layers 15 and which causes multi-layer interference between the recording layer 17 and the reflective layer 19 decreases and the amount of reflected light increases. Therefore, the strength of the pushpull signal increases while at the same time the fluctuations of the pushpull signal caused by the unevenness in the thickness of the guide layers 15 decreases.

Figure 13:
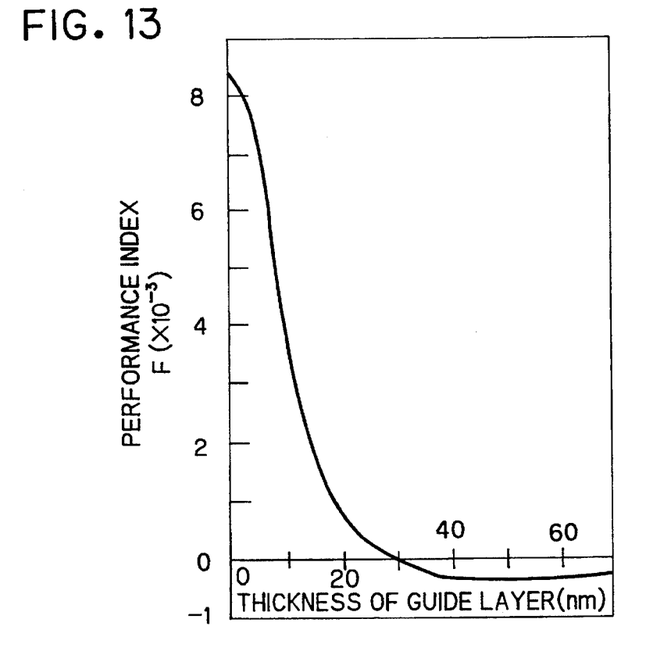
FIG. 13 is a graphical representation showing the influence of the thickness of guide layers on "Figure of Merit"

The optical recording medium can additionally include an enhancement layer 14 formed from a 48.75 nm thick film of silicon nitride, a protective layer 18 formed from a 30.0 nm thick film of silicon nitride, and a reflective layer 19 formed from aluminum. The interference layer 16 can be formed from a 48.75 nm thick film of silicon nitride. The recording layer 17 can be formed from a 25.0 nm thick film of TbFeCo. The guide layers 15 can be made from tantalum. FIG. 13 shows effects of the thickness of the guide layers 15 in such an optical recording medium on the "Figure of Merit" F of the guide region 22. The "Figure of Merit" F shows an amount that is in proportion with the strength of the reproduction signal. The "Figure of Merit" F is determined by the following equation (1):

$$F=\sqrt{R}\sin(2\theta_K) \quad (1)$$

wherein R is the reflectivity; and $\theta_K$ is the appearance of the Kerr effect.

Compared to the "Figure of Merit" $F_0$ when there are no guide layers (i.e., the guide layers are zero nm thick), the "Figure of Merit" $F_{20}$ is 0.083 $F_0$ when the guide layers 15 are 20 nm thick, and the "Figure of Merit" $F_{25}$ is 0.025 $F_0$ when the guide layers 15 are 25 nm thick. Therefore, even if the recording mark written on the recording region 20 spreads to the guide region 22, or if recording is erroneously performed on the guide region 22, the strength of the reproduction signal through the guide layers 15 will only be −21 dB or less when the guide layers 15 are 20 nm thick and will only be −32 dB or less when 25 nm thick with respect to the strength of the reproduction signal from the recording region 20. These values are almost small enough to disregard. Because the signal reproduced through the guide layers 15 is the source of noise and crosstalk, the guide layers 15 should be made 20 nm thick or thicker and preferably 23 nm thick or thicker.

Figure 14:
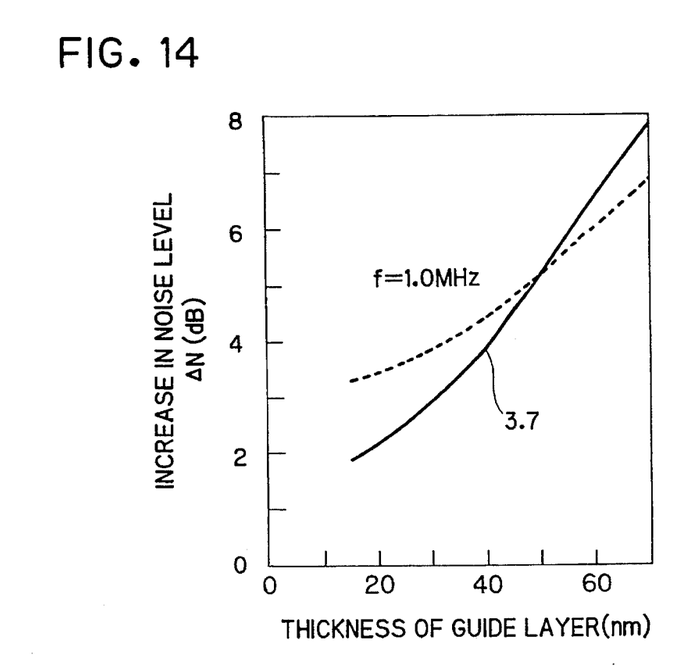
FIG. 14 is a graphical representation showing effect on increase in noise level of thickness of the guide layers.

FIG. 14 shows the increase in noise level ΔN generated when the optical recording medium is rotated from a standstill to a linear speed of 5.7 m/s and recording or reproduction is performed at a frequency of 1 MHz or 3.7 MHz. The thicker the guide layers 15, the greater increase in noise level ΔN generated from the wall surfaces of the guide layers 15. Quality of the reproduction signal drops when the guide layers 15 are too thick. In order to secure a practical signal-to-noise ratio and to keep the increase in noise level ΔN to 5 dB or less, it is preferable to form the guide layers 15 to a thickness of 40 nm or less.

Figure 15:
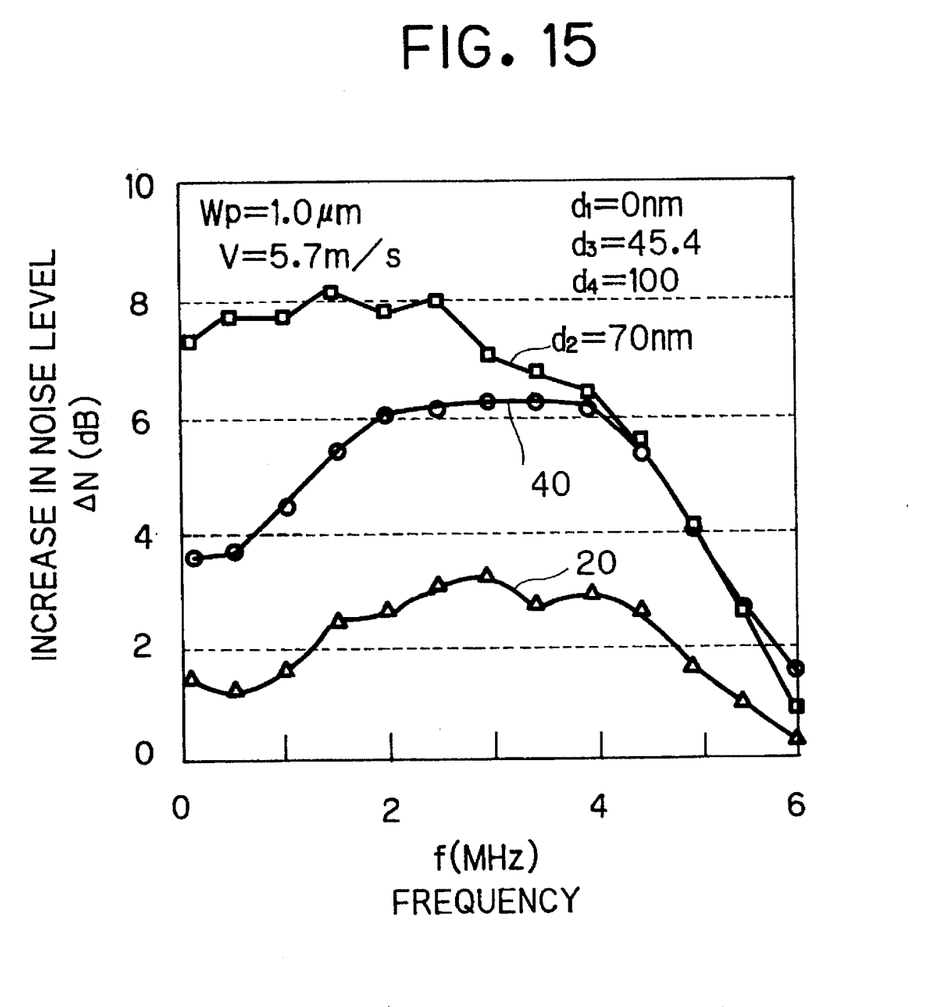
FIG. 15 is a graphical representation showing effect of frequency on increase in noise level from guide layers.

When the guide layers 15 are formed to a thickness of 40 nm or more, disk noise ΔN increases and the signal-to-noise ratio decreases, as shown in FIG. 14. As shown in FIG. 15, the disk noise ΔN becomes extremely large when the range used for recording or reproducing a signal is 1 to 3.7 MHz (at a linear speed v of 5.7 m/s).

The guide layers 15 of an optical recording medium according to the third preferred embodiment can also be made from aluminum, chrome, or other material with a high reflectivity so that the strength of the pushpull signal and the stability of the tracking characteristic can be increased. The recording layer 17 can be formed from organic pigments; from tellurium (Te) or other materials applicable with pit-forming recording; or from germanium-tellurium-antimony (GeTeSb) or other materials applicable with phase change recording. There are no particular limitations to the materials used for forming the substrate 12, the enhancement layer 14, the interference layer 16, or the protective layer 18. There are no particular limitations to the width or the pitch of the guide region.

While the invention has been described in detail with reference to specific embodiments thereof, it would be apparent to those skilled in the art that various changes and modifications may be made therein without departing from the spirit of the invention, the scope of which is defined by the attached claims.

What is claimed is:

1. An optical recording medium comprising:

a substrate;

a recording layer;

an enhancement layer formed between said substrate and said recording layer from an unetchable aluminum compound layer made from a compound that contains aluminum;

an unetchable guide layer formed between said substrate and said recording layer into a predetermined pattern; and an interference layer formed between said substrate and said recording layer.

2. An optical recording medium as claimed in claim 1, wherein said unetchable aluminum compound of the enhancement layer is a material selected from the group consisting of AlN, $Al_2O_3$, and SiAlON.

3. An optical recording medium as claimed in claim 1, wherein said enhancement layer further includes a non-aluminum layer formed from a material other than an aluminum compound.

4. An optical recording medium as claimed in claim 3, wherein said non-aluminum layer is closer to the substrate than is said aluminum compound layer.

5. An optical recording medium as claimed in claim 3, wherein said aluminum compound layer is closer to the substrate than is the non-aluminum layer.

6. An optical recording medium as claimed in claim 3, wherein said non-aluminum layer is formed from a material which accumulates faster during sputtering than does the compound of the aluminum compound layer.

7. An optical recording medium as claimed in claim 1, further comprising a protective layer formed from a silicon nitride.

8. An optical recording medium comprising:

a substrate;

a recording layer;

an unetchable enhancement layer formed between said substrate and said recording layer;

an unetchable guide layer formed between said substrate and said recording layer into a predetermined pattern from a material with a high reflectivity to a thickness of 50 nm or less; and an interference layer formed between said substrate and said recording layer.

9. An optical recording medium as claimed in claim 8, wherein said guide layer is formed to a thickness of 20 nm or greater and 40 nm or less.

10. An optical recording medium as claimed in claim 9, wherein said guide layer is formed to a thickness of 23 nm or greater and 40 nm or less.

11. An optical recording medium as claimed in claim 10, wherein said material of the guide layer is selected from a group consisting of tantalum, chrome, and aluminum.

12. An optical recording medium comprising:

a substrate;

a recording layer;

an unetchable enhancement layer formed between said substrate and said recording layer;

an unetchable guide layer formed between said substrate and said recording layer into a predetermined pattern from chrome; and an interference layer formed between said substrate and said recording layer.

13. An optical recording medium as claimed in claim 12, wherein said guide layer is formed to a thickness of 5 nm or greater and 50 nm and less.

14. An optical recording medium as claimed in claim 13, wherein said guide layer is formed to a thickness of 20 nm or greater and 50 nm and less.

15. An optical recording medium as claimed in claim 12, wherein said guide layer is formed using plasma etching techniques.

16. An optical recording medium as claimed in claim 15, wherein said plasma etching techniques involve application of a chlorine compound.

17. An optical recording medium as claimed in claim 16, wherein said chlorine compound is $CCl_4$.

* * * * *